(12) United States Patent
Jacob

(10) Patent No.: US 7,840,874 B2
(45) Date of Patent: Nov. 23, 2010

(54) SPECULATIVE CACHE TAG EVALUATION

(75) Inventor: Rojit Jacob, Sunnyvale, CA (US)

(73) Assignee: MIPS Technologies, Inc., Sunnyvale, CA (US)

( * ) Notice: Subject to any disclaimer, the term of this patent is extended or adjusted under 35 U.S.C. 154(b) by 963 days.

(21) Appl. No.: 11/616,558

(22) Filed: Dec. 27, 2006

(65) Prior Publication Data

US 2008/0163008 A1 Jul. 3, 2008

(51) Int. Cl.
*H03M 13/00* (2006.01)
(52) U.S. Cl. ............................ 714/758; 714/10; 714/799
(58) Field of Classification Search .................... 714/10, 714/758, 799
See application file for complete search history.

(56) References Cited

U.S. PATENT DOCUMENTS

| | | | |
|---|---|---|---|
| 6,502,218 B1 * | 12/2002 | George et al. ............... | 714/805 |
| 6,832,294 B2 * | 12/2004 | Wicki et al. ................ | 711/128 |
| 6,868,484 B2 * | 3/2005 | Supnet ....................... | 711/133 |
| 6,912,628 B2 * | 6/2005 | Wicki et al. ................ | 711/156 |
| 7,120,836 B1 * | 10/2006 | Englin et al. ............... | 714/53 |
| 7,127,643 B2 * | 10/2006 | Tremblay et al. ............ | 714/52 |
| 7,373,466 B1 * | 5/2008 | Conway ...................... | 711/156 |
| 7,376,877 B2 * | 5/2008 | Quach et al. ................ | 714/746 |
| 7,395,489 B2 * | 7/2008 | Itou et al. ................... | 714/773 |
| 2002/0129208 A1 | 9/2002 | Barroso et al. | |
| 2004/0117558 A1 | 6/2004 | Krick et al. | |
| 2006/0010354 A1 | 1/2006 | Azevedo et al. | |

OTHER PUBLICATIONS

International Search Report of May 5, 2008 in corresponding international application PCT/US07/87632.
Written Opinion of May 5, 2008 in corresponding international application PCT/US07/87632.

* cited by examiner

*Primary Examiner*—Esaw T Abraham
(74) *Attorney, Agent, or Firm*—Townsend and Townsend and Crew LLP

(57) ABSTRACT

A cache tag comparison unit in a cache controller evaluates tag data and error correction codes to determine if there is a cache hit or miss. The cache tag comparison unit speculatively compares the tag data with the request tag without regard to error correction. The error correction code verifies whether this initial comparison is correct and provides a confirmed cache hit or miss signal. The tag data is compared with the request tag to determine a provisional cache hit or miss, and in parallel, the error correction code is evaluated. If the error code evaluation indicates errors in the tag data, a provisional cache hit is converted into a cache miss if errors are responsible for a false match. If the error code evaluation identifies the locations of errors, a provisional cache miss is converted into a cache hit if the errors are responsible for the mismatch.

44 Claims, 5 Drawing Sheets

200

SPECULATIVE CACHE TAG EVALUATION

BACKGROUND OF THE INVENTION

This application relates to the field of microprocessor architectures, and specifically to cache memory control logic. Processors often use one or more cache memories to reduce memory access time and minimize or eliminate periods when the microprocessor is idle and waiting for data. Cache memories typically store a temporary copies of program instructions and data. Cache memory can be integrated within the same integrated circuit die or same integrated circuit package as the processor, or be an external device interfaced with the processor.

Cache memories are comprised of many cache memory locations, referred to as cache lines. Each cache line typically includes space for storing cached data or instructions (generally referred to as cache data) and a cache tag that uniquely identifies the cache data stored in the cache line. Typically, the cache tag is comprised of all or a portion of the system memory address associated with the original copy of the cache data. Cache lines can also include other data fields to store cache coherency information, which is used to maintain the integrity of the data stored in system memory and any copies stored in the cache memory.

When a processor reads data from memory or writes data to memory, a cache controller identifies one or more cache lines that potentially include a copy of the data. The cache controller compares the tag data of the identified cache lines with all or a portion of the address of the data specified by the processor to determine if one of these identified cache lines actually includes the data specified by the processor. If the cache tag matches the address of the data, a cache hit occurs and the cache controller can retrieve the requested data from the cache memory (if the processor is reading data) or can write the data to cache memory (if the processor is writing data). If the cache tag does not match the address of the data, a cache miss occurs and the processor must read or write the specified data to system memory or a higher level cache memory, if any.

Data stored in cache memories can become corrupted. Data corruption can cause erroneous output data and crash programs and microprocessor systems. To mitigate against data corruption, some cache memories include error detection and/or correction codes. Error detection codes can detect the presence of data errors of one and sometimes more bits in the cache line. Typically, any part of the cache line can become corrupted, including the cache data, the cache tag, and/or cache coherency data. Error correction codes can detect and sometimes correct data errors of one or more bits in the cache lines.

When a processor reads data and the cache memory includes error detection and/or correction codes, the cache controller retrieves the cache tag, the cache data, and the error detection and/or correction code for a cache line. In prior systems, the cache memory controller evaluates the error detection and/or correction code for the cache line to determine if the cache data and cache tag in the cache line is valid or corrupted. If the cache data and cache tag are valid (or if the error correction code can correct any data errors to make the cache data and cache tag valid), then the cache controller compares the cache tag with all or a portion of the address of the specified data to determine if there is a cache hit or a cache miss.

Typically, cache controllers and other part of microprocessors are pipelined to improve performance. Pipelined processors divide data processing into a sequence of pipeline stages connected in series. Each pipeline stage operates independently, allowing different portions of multiple sequential instructions to be processed in parallel, much like an assembly line manufactures multiple items at the same time. Pipelining increases the throughput of data processing operations.

Because evaluating error detection and correction codes and comparing cache tags with addresses requires a substantial amount of time to complete, prior cache controllers implement the error detection and correction evaluation and the cache tag comparison in separate pipeline stages. Because of the need for at least two pipeline stages to implement cache hit/miss evaluation with error detection and correction, performance is degraded as compared with cache controllers that do not include error detection and correction.

It is therefore desirable for a cache controller to provide improved performance with cache memory having error detection and correction. It is also desirable for the cache controller to use error correction codes to minimize the number of cache misses resulting from cache tag data errors. It is further desirable for the cache controller to require minimal additional resources as compared with cache controllers without error detection and/or correction capabilities. It is also desirable for the cache controller to be adaptable to cache memories with error detection only or with error detection and correction.

BRIEF SUMMARY OF THE INVENTION

An embodiment of the invention includes a cache tag comparison unit in a cache memory controller adapted to evaluate cache tag data and error correction code to determine if there is a cache hit or cache miss in response to a cache request. The cache tag comparison unit speculatively compares the tag data with the request tag without regard to error detection and/or correction to determine if there might be a cache hit or cache miss. After this initial comparison, the error detection and/or correction data is used to verify whether this initial comparison is correct, because there are no detectable bit errors, or incorrect, because there are detectable bit errors. The cache tag comparison unit then provides a confirmed cache hit or cache miss output signal based on the initial comparison and the error detection and/or correction data.

In an embodiment, the cache tag comparison unit compares the tag data of a selected cache line with the request tag to determine if there is a provisional cache hit or cache miss. In an embodiment, the cache tag comparison unit evaluates the error correction code and the tag data in parallel with this comparison. If the results of the error correction code evaluation indicate that there are no errors in the tag data, the cache tag comparison unit confirms the provisional cache hit or cache miss. Conversely, if the results of the error correction code evaluation indicate that there are errors in the tag data, a provisional cache hit can be converted into a cache miss if the errors are responsible for a false match between the tag data and the request tag. If the error correction code evaluation can identify the locations of the errors, a provisional cache miss can be converted into a cache hit if the errors are responsible for the mismatch between the tag data and the request data.

BRIEF DESCRIPTION OF THE DRAWINGS

The invention will be described with reference to the drawings, in which.

DETAILED DESCRIPTION OF THE INVENTION

Figure 1:
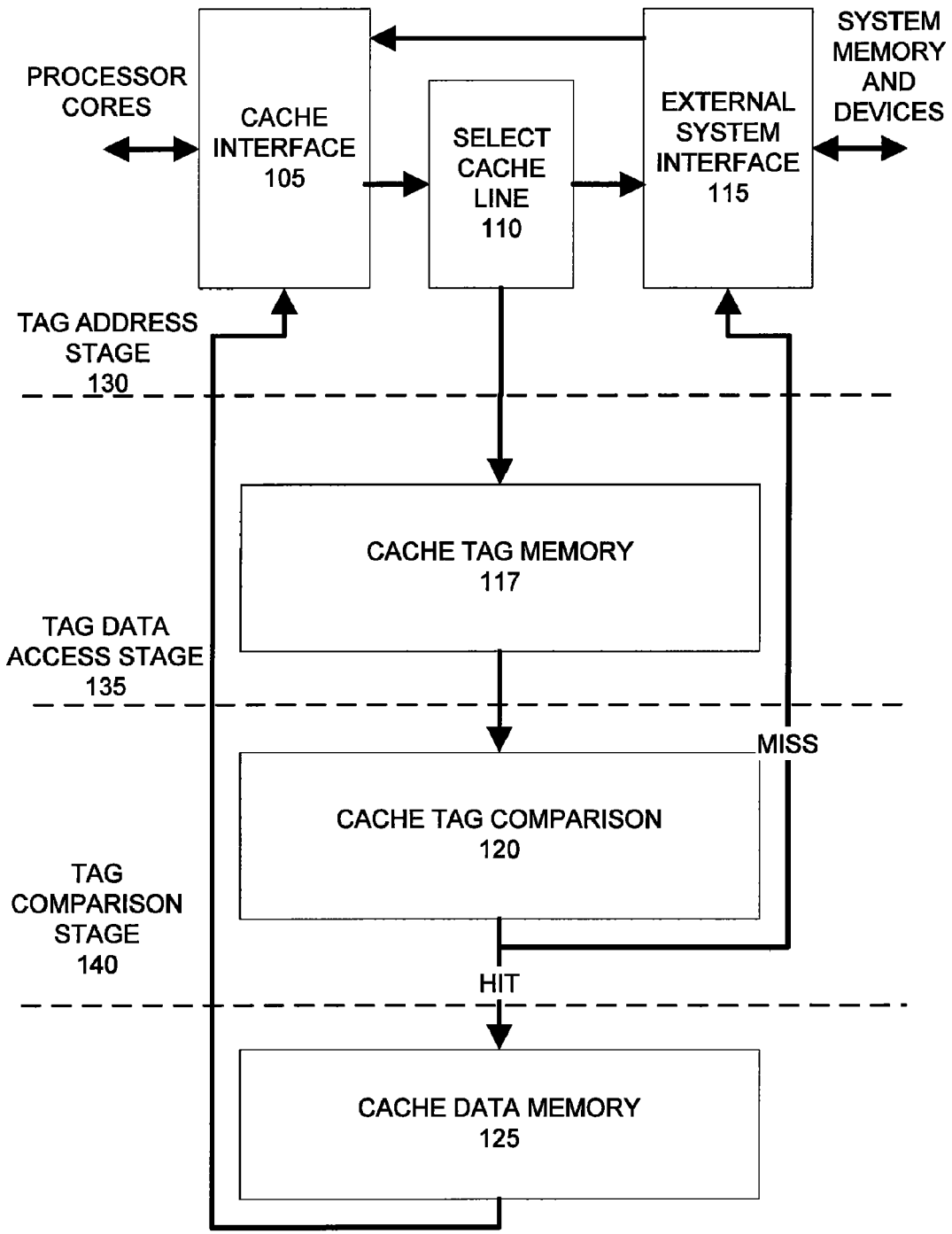
FIG. 1 illustrates a cache controller according to an embodiment of the invention.

FIG. 1 illustrates a cache controller 100 according to an embodiment of the invention. Cache controller 100 includes a cache interface 105 adapted to receive requests from one or more processor cores. Requests can be read or write requests for instructions and/or data. Each request includes a memory address or other information identifying the location of the information pertaining to the request, such as the location in system memory or elsewhere in the system (for example if the system includes memory-mapped I/O) from where the instruction and/or data should be retrieved or the location in system memory or a location in system memory or elsewhere in the system where instructions and/or data should be stored.

For each request, a cache line selector 110 selects one or more cache lines potentially storing a copy of the instructions or data specified by the request. If the cache line selector 110 initially determines that the cache memory does not store the instructions or data corresponding with the request, such as if the request corresponds to a memory address range that is not cached, then the request is forwarded to the external system interface 115, so that the data can be fetched from memory or another part of the microprocessor system.

If the cache line selector 110 selects one or more cache lines for the data request, then cache tag data corresponding with the selected cache lines is retrieved from the cache tag memory 115. An embodiment of the invention includes a cache tag comparator 120 that compares cache tag data with tag data from the request to determine if one of the selected cache lines includes a copy of the requested data, referred to as a cache hit. As described in detail below, the cache tag comparator 120 also evaluates error detection and/or correction codes associated with the cache tag data to ensure that the cache tag is valid and to minimize false cache hits or misses due to corrupt cache tag data.

If the cache tag comparator 120 determines that there is a cache hit and the request is a read request, then the requested instructions and/or data is retrieved from the cache data memory 125 and provided to the cache interface 105 for return to the requesting processor core. If the cache tag comparator 120 determines that there is a cache hit and the request is a write request, then the instructions and/or data specified by the request is stored in the appropriate cache line in the cache data memory 125. Additionally, the cache controller 100 will update cache coherency data associated with this cache line to ensure that the instructions and/or data stored in the cache data memory 125 will eventually be written back to the system memory.

Conversely, if the cache tag comparator 120 determines that none of the selected cache lines include a copy of the requested instructions and/or data, referred to as a cache miss, then the request is provided to the external system interface 115, so that the data can be fetched from system memory or another part of the system.

Cache controller 100 can include numerous other portions omitted for clarity in FIG. 1, such as portions for caching instructions and data retrieved from the system and forwarding this information to one or more processor cores; portions for evicting instructions and data from the cache memory to make room for more important data; portions for arbitrating access to the cache memory between the system and one or more processor cores; portions for updating the system with changes to instructions and/or data in the cache memory; and portions for verifying the integrity of cached instructions and data. The function and implementation of these omitted portions are well understood to those of ordinary skill in the art.

An embodiment of the cache controller is divided into a set of pipeline stages, including tag address stage 130, tag data access stage 135, tag comparison stage 140, and one or more cache data access stages 145. Each stage is capable of processing a different request in parallel with the other pipeline stages. Thus, the cache data access stages 145 can retrieve cache data associated with a first request at the same time that the tag comparison stage 140 evaluates the cache tag data associated with a second request, the tag data access stage 135 retrieves cache tag data associated with a third request, and the tag address stage 130 processes a fourth request.

Figure 2:
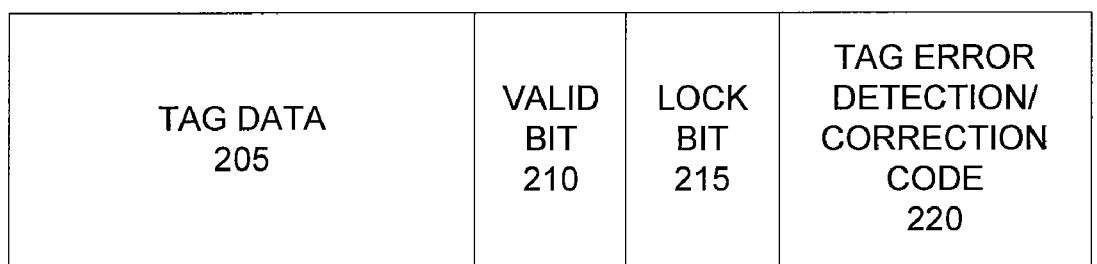
FIG. 2 illustrates the portions of a cache line suitable for use with an embodiment of the invention.
Figure 2:
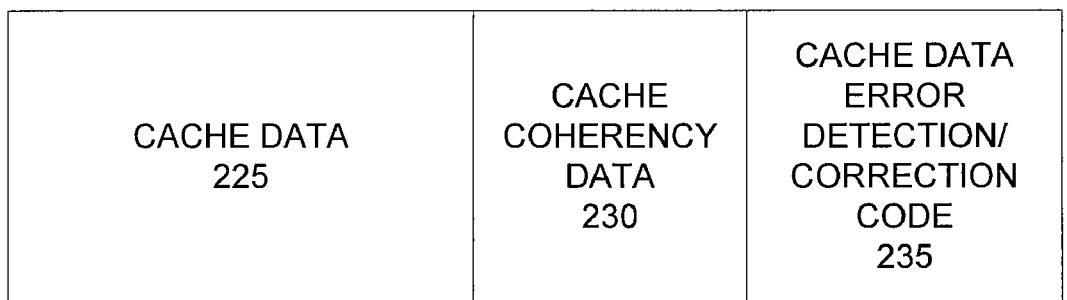

FIG. 2 illustrates the portions of a cache line 200 suitable for use with an embodiment of the invention. Cache line 200 includes a cache tag field 205 for storing tag data, a valid bit 210 to indicate whether the data stored by the cache line is valid, a lock bit 215 to indicate whether the data stored by the cache line is locked, and a tag error detection and/or correction code field 220. Cache line 200 also includes a cache data field 225 for storing cache data, cache coherency data field 230 for synchronizing the cache data with system memory, and optional cache data error detection and/or correction code 235.

Field 220 is adapted to store an error detection and/or correction code for all or a portion of the data of the cache line 200, such as the entire cache line or portion 240 of the cache line. In an embodiment, field 220 stores an error detection and/or correction code for portion 240 of the cache line 200, which includes fields 205, 210, 215, and 220. In this embodiment, field 220 can detect and/or correct errors in fields 205, 210, 215, and 220. Embodiments of the invention can use any error detection and/or correction scheme known in the art, such as parity schemes, cyclic redundancy checks, hashing functions, Hamming codes, and Reed-Solomon codes. For example, a parity scheme can detect a single bit error in portion 240 of cache line 200. A Hamming code can detect and correct a single bit error or detect a two bit error in portion 240 of cache line 200.

Similarly, field 235 stores an error detection and/or correction code for portion 245 of the cache line 200, which includes fields 225, 230, and 235. In an embodiment, the field 235 can also use any type of error detection and/or correction scheme known in the art. The scheme used in field 235 can be the same or different than the scheme used in field 220.

In an embodiment, portion 240 of the cache line 200 is located in a cache tag memory, such as cache tag memory 117 discussed above, and portion 245 of the cache line 200 is located in a cache data memory, such as cache data memory 125. In another embodiment, field 235 can be omitted if portions 240 and 245 of cache line 200 are in the same memory or are retrieved at the same time. In this case, field 220 can be used for error detection and/or correction of fields 205, 210, 215, 220, 225, and 230. In still other embodiments, field 235 can be omitted if error detection and/or correction is not required for portion 245 of the cache line 200.

Figure 3:
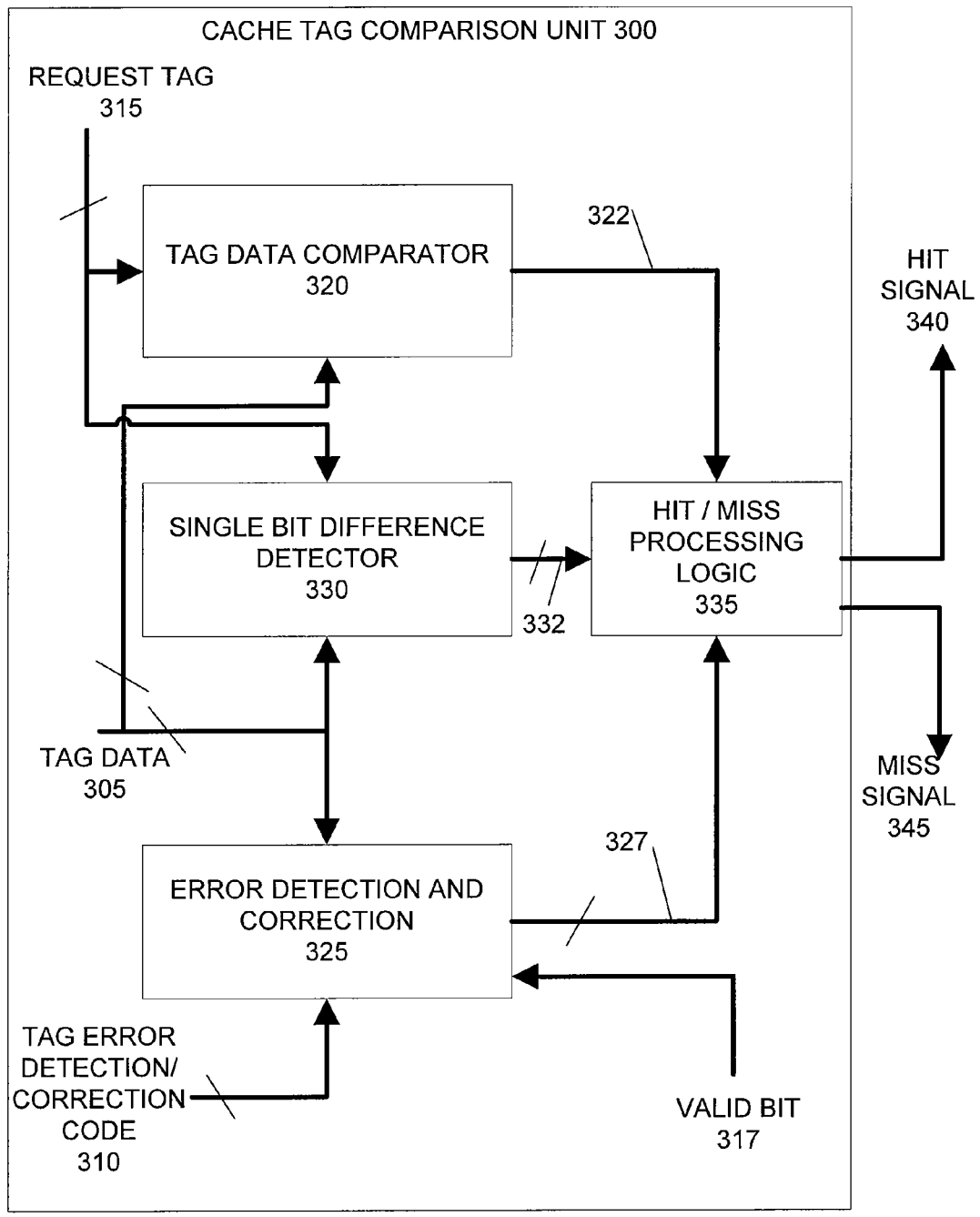
FIG. 3 illustrates a cache tag comparison pipeline stage logic according to an embodiment of the invention.

FIG. 3 illustrates a cache tag comparison unit 300 according to an embodiment of the invention. In a sense, the cache tag comparison unit 300 speculatively compares the tag data with the request tag without regard to error detection and/or correction to determine if there might be a cache hit or cache miss. After this initial comparison, the error detection and/or correction data is used to verify whether this initial comparison is correct, because there are no detectable bit errors, or incorrect, because there are detectable bit errors. The cache tag comparison unit 300 then provides a confirmed cache hit or cache miss output signal based on the initial comparison and the error detection and/or correction data.

An embodiment of the cache tag comparison unit 300 corresponds with cache tag comparison unit 120 implemented in cache tag comparison pipeline stage 140 discussed above. Cache tag comparison unit 300 receives cache tag data 305 from a selected cache line. In an embodiment, cache tag data 305 corresponds with the cache tag stored in field 205 of cache line 200. In an embodiment, the cache tag data 305 is retrieved from cache tag memory 117.

Cache tag comparison unit 300 also receives an error detection and/or correction code 310. In an embodiment, the tag error detection and/or correction code 310 is retrieved from field 220 of a cache line 200. Similarly, the cache tag comparison unit 300 receives a valid bit 317. In an embodiment, valid bit 317 is retrieved from field 210 of cache line 200.

Additionally, cache tag comparison unit 300 receives a request tag 315. Request tag 315 identifies the instructions and/or data of the request received by the cache memory controller. As discussed above, the request tag 315 can correspond with all or a portion of the memory address specified by the request.

A tag data comparator 320 compares the request tag 315 with the tag data 305. Output 322 provides a true value to hit/miss processing logic 335 if the request tag 315 is equal to the tag data 305 and a false value to hit/miss processing logic 335 if the request tag 315 is not equal to the tag data 305. In this embodiment, a true value on output 322 indicates a provisional cache hit and a false value indicates a provision cache miss. These provisional cache hit and miss signals will be validated or invalidated based on the error detection and/or correction code.

Error detection and correction logic 325 receives the tag error detection and/or correction code 310, the tag data 305, and the valid bit 317. Error detection and correction logic 325 uses an error detection and/or correction algorithm, such as a Hamming code error correction scheme, to determine if there are one or more errors within the tag error detection and/or correction code 310, the tag data 305, and the valid bit 317. If there are no detectable errors, the error detection and correction logic 325 provides a signal indicating this via output 327 to the hit/miss processing logic 335. Output 327 also provides the valid bit or, if the valid bit includes a correctable error, a corrected valid bit to the hit/miss processing logic 335.

In an embodiment using a Hamming code or similar error correction scheme, if there is only a single bit error, the error detection and correction logic 325 output 327 provides the location of the error within this data to the hit/miss processing logic 335. If there is a two bit error, the error detection and correction logic 325 output 327 provides an indicator of an error to the hit/miss processing logic 335. This indicator specifies that there is at least a two bits error somewhere within the tag error detection and/or correction code 310, the tag data 305, and the valid bit 317, but does not specified the locations of these errors.

A single bit difference detector 330 receives the tag data 305 and the request tag 315. The single bit different detector 330 determines if the tag data 305 and the request tag 315 differ, if at all, by only a single bit or by more than one bit. If the tag data 305 and the request tag differ by a single bit, then single bit difference detector 330 provides signals via output 332 to the hit/miss processing logic 335 to indicate the location of the non-matching bit. Otherwise, the single bit difference detector 330 provides a signal via output 332 to the hit/miss processing logic to indicate that the tag data 305 and the request tag 315 either differ by more than a single bit or are identical.

Based on the signals provided by the tag data comparator 320, the error detection and correction logic 325, and the single bit difference detector 330, the hit/miss processing logic 335 determines whether there has been a cache hit or a cache miss. A cache hit will occur if the tag data 305 matches the request tag 315, after any error correction (if necessary), and if the cache line includes valid data, which is indicated by the valid bit 317. If these conditions are not satisfied, then a cache miss occurs. In an embodiment, the hit/miss processing logic provides either a hit signal via hit signal output 340 or a miss signal via miss signal output 345. The cache memory controller responds to a hit or miss signal as described above.

Table 1 enumerates the behavior of an embodiment of the hit/miss processing logic 335.

TABLE 1

Hit/Miss Processing Logic

| Error Status | Tag Comparison Before Error Correction | Tag Comparison After Error Correction |
|---|---|---|
| No Error | Provisional Hit - Tag Data matches Request Tag. | Cache Hit |
| | Provisional Miss - Tag Data does not match Request Tag. | Cache Miss |
| Single Error in Lock Bit | Provisional Hit - - Tag Data matches Request Tag. | Cache Hit - Lock bit does not affect tag comparison. |
| | Provisional Miss - Tag Data does not match Request Tag. | Cache Miss - Lock bit does not affect tag comparison. |
| Single Error in Valid Bit | Provisional Hit - Tag Data matches Request Tag and Valid bit is true. | Cache Miss - Valid bit should have been false and therefore cached data is not valid. |
| | Provisional Miss - Tag Data matches Request Tag, but Valid bit is false, indicating that cached data is invalid. | Cache Hit - Valid bit should have been true and therefore cached data is valid. |
| Single Error in Tag Data | Provisional Hit - Tag Data matches Request Tag. | Cache Miss - Single bit error resulted in a false match between the Tag Data and the Request Tag. |

TABLE 1-continued

Hit/Miss Processing Logic

| Error Status | Tag Comparison Before Error Correction | Tag Comparison After Error Correction |
| --- | --- | --- |
| | Provisional Miss - One bit difference between Tag Data and Request Tag and the detected error is on the differing bit. | Cache Hit - Single bit error resulted in a false mismatch between the Tag Data and the Request Tag. |
| | Provisional Miss - One bit difference between Tag Data and Request Tag and the detected error is not on the differing bit. | Cache Miss - After correcting for the single bit error, the Tag Data and the Request Tag will differ by two bits. |
| | Provisional Miss - Tag Data and Request Tag differ by multiple bits. | Cache Miss - After correcting for the single bit error, the Tag Data and the Request Tag will still differ by at least one bit. |
| Single Error in Tag Error Correction Code | Provisional Hit - Tag Data matches Request Tag. | Cache Hit - an error in the error correction code does not affect the cache tag comparison. |
| | Provisional Miss - Tag Data does not match Request Tag. | Cache Miss - an error in the error correction code does not affect the cache tag comparison. |
| Two Bit Error | Provisional Hit - Tag Data matches Request Tag. | Cache Miss - Code can detect but cannot locate the two erroneous bits, so to be safe it must be assumed that the errors are in the Tag Data and/or the valid bit. |
| | Provisional Miss - Tag Data does not match Request Tag. | Cache Miss - Code can detect but cannot locate the two erroneous bits, so to be safe it must be assumed that the Tag Data and Request Tag do not match. |

In a further embodiment, the cache tag comparison unit 300 can update all or portion of a cache line to correct for a detected error. For example, if the error detection and correction logic 325 detects a single bit error in the tag data 205, the valid bit 210, the lock bit 215, or the tag error detection/correction code 220 of a cache line, the cache tag comparison unit 300 will provide the corrected data to the cache memory to be stored.

In another embodiment, the cache tag comparison unit 300 can be simplified to detect, but not correct, errors of one or more bits in the tag data. In this embodiment, the cache tag comparison unit 300 generates a cache miss whenever an error in the tag data or any other part of the cache line is detected.

In an embodiment, the tag data comparator 320, the error detection and correction logic 325, and the single bit difference detector 330 are configured to operate in parallel. The outputs of the tag data comparator 320, the error detection and correction logic 325, and the single bit difference detector 330 are then provided roughly simultaneously to the hit/miss processing logic 335. As a result, an embodiment of the cache tag comparison unit 300 can evaluate error detection and correction data and determine if there is a cache hit or miss within a single clock cycle. This allows the cache tag comparison unit 300 to operate within a single pipeline stage.

Embodiments of the cache tag comparison unit 300, as well as other portions of the cache controller 100, can be implemented using standard logic gates, registers, and other logic circuits known in the art. Alternate embodiments of the invention can be implemented using programmable device hardware, such as FPGAs, or as part of ASICs architectures.

Figure 4:
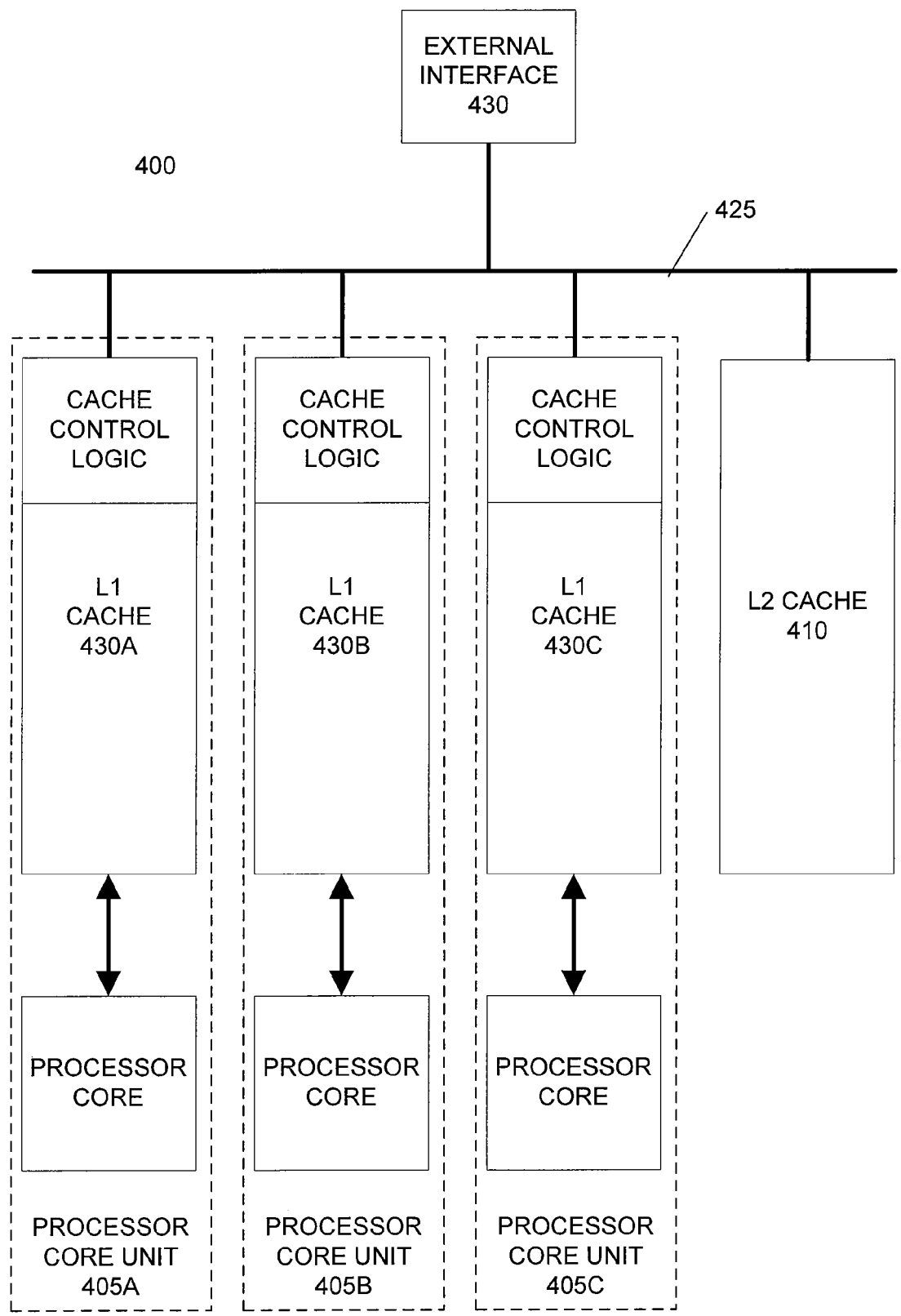
FIG. 4 illustrates an example microprocessor including an embodiment of the invention.

FIG. 4 illustrates an example microprocessor 400 including an embodiment of the invention. Processor 400 includes an L2 cache memory 410 to improve processor performance. In an embodiment, the L2 cache memory 410 includes a cache controller such as cache controller 100 described above. Embodiments of example processor 400 include two or more processor core units 405, such as processor core units 405A, 4055B, and 405C. Additionally, processor core units 405 are connected via at least one data bus 425 with each other and with external interface 430.

In an embodiment, L2 cache memory 410 is connected to processor core units 405 via data bus 425. In this embodiment, L2 cache memory 410 is shared with two or more of the processor core units 405. L2 cache memory 410 can store data potentially needed by one or more of the processor core units 405.

In an embodiment, the processor core units 405 each include L1 cache memories and associated cache control logic 430, such as L1 cache memories 430A, 430B, and 430C. An embodiment of the L1 cache memories and associated cache control logic 430 includes cache tag comparison units similar to cache tag comparison unit 300 discussed above. In this embodiment, errors in cache tag data or elsewhere in a cache line can be detected and potentially corrected in parallel with the cache tag comparison, allowing the cache tag comparison to be performed in a single pipeline stage. In another embodiment, the L1 cache memories and associated cache control logic 430 include a simplified cache tag comparison unit that can detect, but not correct, errors in cache tag data or elsewhere in a cache line. In this embodiment, the cache tag comparison unit generates a cache miss whenever an error is detected in the cache tag data.

Figure 5:
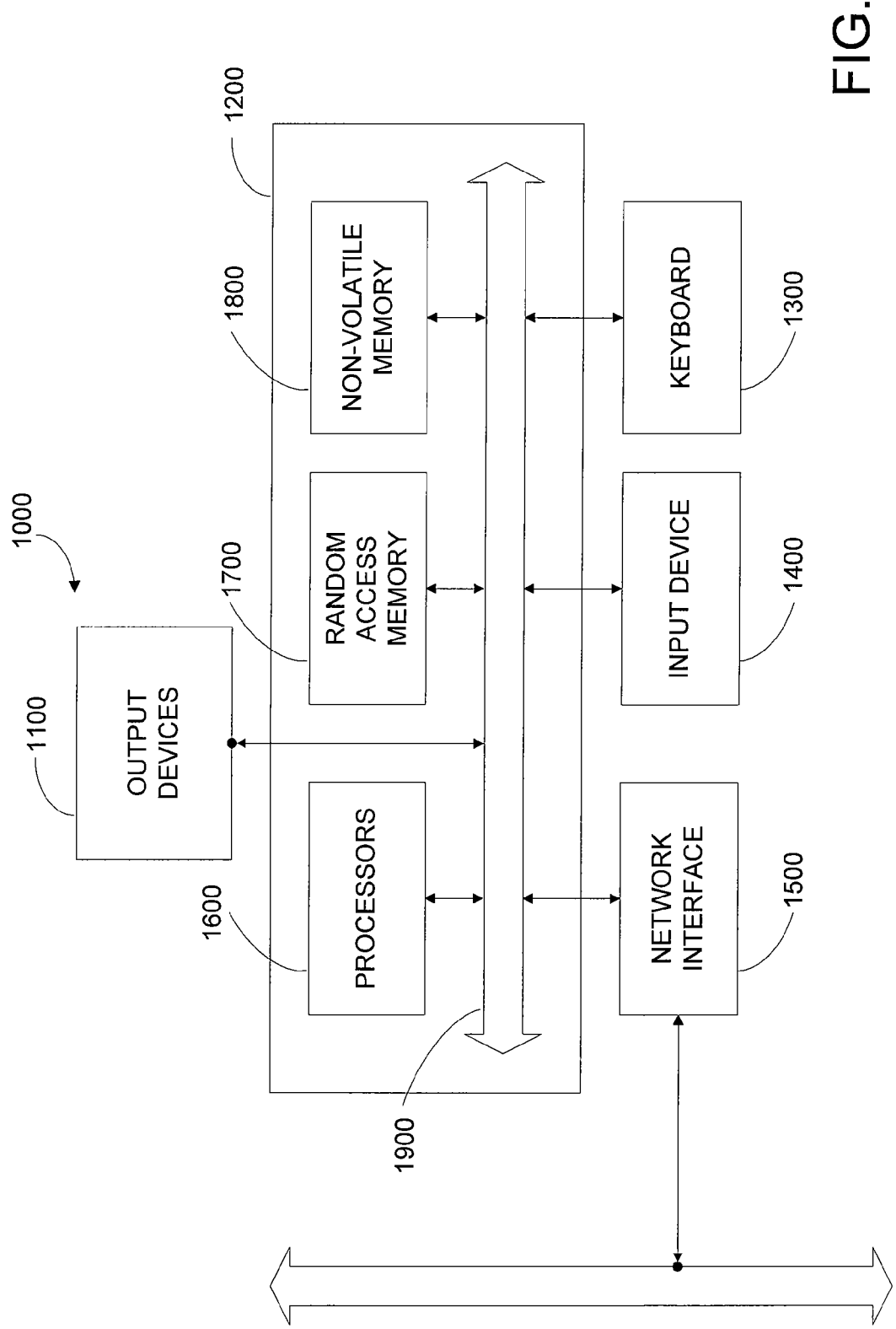
FIG. 5 illustrates a computer system suitable for use with an embodiment of the invention.

FIG. 5 illustrates a computer system 1000 suitable for use with an embodiment of the invention. Computer system 1000 typically includes one or more output devices 1100, including display devices such as a CRT, LCD, OLED, LED, gas plasma, electronic ink, or other types of displays, speakers and other audio output devices; and haptic output devices such as vibrating actuators; computer 1200; a keyboard 1300; input devices 1400; and a network interface 1500. Input devices 1400 can include a computer mouse, a trackball, joystick, track pad, graphics tablet, touch screen, microphone, various sensors, and/or other wired or wireless input devices that allow a user or the environment to interact with computer system 1000. Embodiments of network interface 1500 typically provides wired or wireless communication with an electronic communications network, such as a local area network, a wide area network, for example the Internet, and/or virtual networks, for example a virtual private network (VPN). Network interface 1500 can implement one or more wired or wireless networking technologies, including Ethernet, one or more of the 802.11 standards, Bluetooth, and ultra-wideband networking technologies.

Computer 1200 typically includes components such as one or more general purpose processors 1600, and memory storage devices, such as a random access memory (RAM) 1700 and non-volatile memory 1800. Non-volatile memory 1800 can include floppy disks; fixed or removable hard disks; optical storage media such as DVD-ROM, CD-ROM, and bar codes; non-volatile semiconductor memory devices such as flash memories; read-only-memories (ROMS); battery-backed volatile memories; paper or other printing mediums; and networked storage devices. System bus 1900 interconnects the above components. Processors 1600 can include embodiments of the above described processors, such as processors 100 and 400.

RAM 1700 and non-volatile memory 1800 are examples of tangible media for storage of data, audio/video files, computer programs, applet interpreters or compilers, virtual machines, and embodiments of the herein described invention. For example, embodiments of the above described processors may be represented as human-readable or computer-usable programs and data files that enable the design, description, modeling, simulation, testing, integration, and/or fabrication of integrated circuits and/or computer systems including embodiments of the invention. Such programs and data files may be used to implement embodiments of the invention as separate integrated circuits or used to integrate embodiments of the invention with other components to form combined integrated circuits, such as microprocessors, microcontrollers, system on a chip (SoC), digital signal processors, embedded processors, or application specific integrated circuits (ASICs).

Programs and data files expressing embodiments of the invention can use general-purpose programming or scripting languages, such as C or C++; hardware description languages, such as VHDL or Verilog; and/or standard or proprietary format data files suitable for use with electronic design automation software applications known in the art. Programs and data files can express embodiments of the invention at various levels of abstraction, including as a functional description, as a synthesized netlist of logic gates and other circuit components, and as an integrated circuit layout or set of masks suitable for use with semiconductor fabrication processes.

Further embodiments of computer 1200 can include specialized input, output, and communications subsystems for configuring, operating, simulating, testing, and communicating with specialized hardware and software used in the design, testing, and fabrication of integrated circuits.

Further embodiments can be envisioned to one of ordinary skill in the art from the specification and figures. In other embodiments, combinations or sub-combinations of the above disclosed invention can be advantageously made. The block diagrams of the architecture and flow charts are grouped for ease of understanding. However it should be understood that combinations of blocks, additions of new blocks, re-arrangement of blocks, and the like are contemplated in alternative embodiments of the present invention.

It is understood that the apparatus and method described herein may be included in a semiconductor intellectual property core, such as a microprocessor core (e.g. expressed as a hardware description language description or a synthesized netlist) and transformed to hardware in the production of integrated circuits. Additionally, embodiments of the invention may be implemented using combinations of hardware and software, including micro-code suitable for execution within a processor. The specification and drawings are, accordingly, to be regarded in an illustrative rather than a restrictive sense. It will, however, be evident that various modifications and changes may be made thereunto without departing from the broader spirit and scope of the invention as set forth in the claims.

What is claimed is:

1. A processor comprising:

a first processor core including logic operative to retrieve and store instructions and data from a system memory and logic operative to execute the instructions to process the data;

a first cache memory connected with the first processor core and with the system memory and operative to store a copy of at least a subset of the instructions and the data, wherein the first cache memory includes a plurality of cache lines, each cache line including at least a tag data field operative to store tag data, a cache data field operative to store a portion of the subset of the instructions and data, and a tag error data field operative to store an error detection and/or correction code for at least a portion of the cache line including the tag data field; and a cache controller including cache tag comparison logic operative to determine if at least one selected cache line matches a cache request received from the first processor core, wherein the cache tag comparison logic comprises:

a cache tag comparator unit operative to compare a first tag data in the tag data field of the selected cache line with a request tag associated with the cache request and to output a provisional cache hit or provisional cache miss signal;

an error code processing logic operative to evaluate at least the first tag data and a first error detection and/or correction code in the tag error data field of the selected cache line to output an error signal in response to the presence of at least one bit error in at least a portion of the selected cache line including the first tag data; and tag comparison logic connected with the cache tag comparator unit and the error code processing logic and operative to output a cache hit signal in response to the provisional cache hit signal and the absence of the error signal and to output the cache miss signal in response to the error signal.

2. The processor of claim 1, further comprising:
a single bit difference detector operative to determine if the first tag data and the request tag differ by a single bit and to output a bit difference signal indicating the presence of a single bit difference and the location of the single bit difference; and
wherein the error signal further identifies a location of at least one bit error in the portion of the selected cache line; and
wherein the tag comparison logic is operative to output a cache hit signal in response to the provisional miss signal if the location of the bit error matches the location of the single bit difference provided by the bit difference signal.

3. The processor of claim 2, wherein each cache line further includes a valid field operative to store validation data that indicates if the cache data field is valid.

4. The processor of claim 3, wherein the error code processing logic is further operative to evaluate validation data in the valid field of the selected cache line and the first error detection and/or correction code and to output the error signal in response to the presence of at least one bit error in at least the portion of the selected cache line including the first tag data and the validation data; and
wherein the tag comparison logic is operative to output a cache miss signal in response to the validation data indicating that the cache data field is valid and the error signal indicating that the valid field of the selected cache line includes a bit error.

5. The processor of claim 4, wherein the tag comparison logic is operative to output a cache miss signal in response to the validation data indicating that the cache data field is valid and the error signal indicating that the valid field of the selected cache line includes a bit error.

6. The processor of claim 2, wherein the tag comparison logic is operative to further output a corrected first tag data in response to the error signal and wherein the cache controller further includes logic operative to store the corrected first tag data in the tag data field of the selected cache line.

7. The processor of claim 1, wherein the error detection and/or correction code is a Hamming code.

8. The processor of claim 1, wherein the error detection and/or correction code is operative to detect a single bit error.

9. The processor of claim 8, wherein the error detection and/or correction code is operative to correct a single bit error.

10. The processor of claim 1, wherein the error detection and/or correction code is operative to detect a two bit error.

11. The processor of claim 1, wherein the first cache memory is a first level cache memory.

12. The processor of claim 1, wherein the first cache memory is a second level cache memory.

13. The processor of claim 12, wherein the first cache memory is shared between the first processor core and a second processor core.

14. The processor of claim 1, wherein the cache tag comparator unit and the error code processing logic are operative to operate in parallel.

15. A cache controller operative to receive a cache request from at least a first processor core, the cache controller comprising:
a first pipeline stage including logic operative to select at least one cache line of a cache memory based on the request;
a second pipeline stage including logic operative to access tag data and an error detection and/or correction code from the selected cache line;
a third pipeline stage including first logic operative to compare the tag data with a request tag associated with the cache request to determine if the tag data provisionally matches the request tag, second logic operative to evaluate the tag data and the error detection and/or correction code to determine if at least a portion of the selected cache line including the tag data includes at least one error, and third logic operative to determine if the selected cache line includes cache data specified by the cache request based on the first and second logic, wherein the first and second logic are operative to operate in parallel; and
a fourth pipeline stage operative to access cache data in the selected cache line in response to the determination in the third pipeline stage that the selected cache line includes cache data specified by the cache request.

16. The cache controller of claim 15, wherein the third logic is operative to determine that the selected cache line includes the cache data specified by the cache request in response to the tag data provisionally matching the request tag and the second logic determining that the portion of the selected cache line including the tag data does not include any errors.

17. The cache controller of claim 15, wherein the third logic is operative to determine that the selected cache line includes the cache data specified by the cache request in response to the tag data not provisionally matching the request tag and the second logic determining that the portion of the selected cache line including the tag data includes at least one error responsible for the tag data not provisionally matching the request tag.

18. The cache controller of claim 17, further comprising fourth logic operative to determine if the tag data and the request tag differ by a single bit and to determine a first location of the differing bit.

19. The cache controller of claim 18, wherein the third logic is operative to determine that the selected cache line includes the cache data specified by the cache request in response to the tag data not provisionally matching the request tag, the second logic specifying a second location of an error in the portion of the selected cache line including the tag data, and the second location of the error matching the first location of the differing bit.

20. The cache controller of claim 15, wherein the second pipeline stage further includes logic operative to access a valid bit indicating whether the cache data of the selected cache line is valid and the second logic is further operative to evaluate the valid bit and the error detection and/or correction code to determine if a portion of the selected cache line including the valid bit and the tag data includes at least one error.

21. The cache controller of claim 20, wherein the third logic is operative to determine that the selected cache line includes the cache data specified by the cache request in response to the tag data provisionally matching the request tag, the valid bit specifying that the cache data is valid, and the second logic further determining that the portion of the selected cache line including the valid bit and the tag data does not include any errors.

22. The cache controller of claim 20, wherein the third logic is operative to determine that the selected cache line includes the cache data specified by the cache request in response to the tag data provisionally matching the request tag, the valid bit specifying that the cache data is invalid, and the second logic further determining that the portion of the selected cache line including the valid bit includes an error.

23. The cache controller of claim 15, wherein the error detection and/or correction code is a Hamming code.

24. The cache controller of claim 15, wherein the error detection and/or correction code is operative to detect a single bit error.

25. The cache controller of claim 15, wherein the error detection and/or correction code is operative to correct a single bit error.

26. The cache controller of claim 15, wherein the error detection and/or correction code is operative to detect a two bit error.

27. The cache controller of claim 15, wherein the cache memory is a first level cache memory.

28. The cache controller of claim 15, wherein the cache memory is a second level cache memory.

29. The cache controller of claim 15, wherein the cache memory is shared between the first processor core and a second processor core.

30. The cache controller of claim 15, wherein the third pipeline stage further includes fourth logic operative to output corrected tag data in response to the second logic determining that the portion of the selected cache line including the tag data includes at least one error; and wherein the cache controller further includes logic operative to store the corrected tag data in the selected cache line.

31. A cache tag comparison unit operative to determine if there is a cache hit or a cache miss in response to a cache request, the cache tag comparison unit comprising:
a first input operative to receive a request tag identifying instructions and/or data specified by a cache request;
a second input operative to receive tag data identifying the contents of at least one selected cache line;
a third input operative to receive a tag error correction code for at least a portion of the selected cache line including at least the tag data;
tag data comparator logic connected with the first and second inputs and operative to output a first signal indicating that the tag data matches the request tag;
single bit difference detector logic connected with the first and second inputs and operative to output a second signal indicating if the tag data and the request tag differ by a single differing bit and to indicate a location of the single differing bit within the selected cache line;
error correction logic connected with the second and third inputs and operative to output a third signal indicating an existence and a location of an error in the portion of the selected cache line including the tag data; and
cache hit and miss processing logic operative to receive the first, second, and third signals and to output a cache hit signal in response to the first output signal indicating that the tag data does not match the request tag, the second signal indicating that the tag data and the request tag differ by a single differing bit, the third signal indicating the existence and the location of the error in the portion of the selected cache line including the tag data, and the location of the single differing bit being the same as the location of the error in the portion of the selected cache line.

32. A method of determining a cache hit or a cache miss in response to a cache request, the method comprising:
receiving a request tag identifying instructions and/or data specified by a cache request, tag data identifying the contents of at least one selected cache line; and a tag error correction code for at least a portion of the selected cache line including at least the tag data;
comparing the tag data with the request tag to determine if the tag data matches the request tag;
determining if the tag data and the request tag differ by one or more differing bits;
determining a location of at least one differing bit in response to the determination that the tag data and the request tag differ by at least one differing bit;
determining from the error correction code if a portion of the selected cache line including at least the tag data includes one or more bit errors;
determining a location of at least one bit error in the portion of the selected cache line in response to the determination that the selected cache line includes at least one bit error; and
outputting a cache hit signal if the tag data does not match the request tag and the location of the differing bit matches the location of the bit error.

33. The method of claim 32, further comprising:
outputting a cache hit signal if the tag data matches the request tag and if the portion of the selected cache line does not include any errors; and
outputting a cache miss signal if the tag data does not match the request tag and if the portion of the selected cache line does not include any errors.

34. The method of claim 32, further comprising:
outputting a cache miss signal if the tag data does match the request tag and if the portion of the selected cache line includes an error.

35. The method of claim 32, further comprising:
receiving a valid bit specifying if the selected cache line includes valid data, wherein the valid bit is included in the portion of the selected cache line also including the tag data; and
outputting a cache miss signal if the tag data does match the request tag, the valid bit indicates that the selected cache line is valid, and the location of the bit error corresponds with the valid bit.

36. The method of claim 35, further comprising:
outputting a cache hit signal if the tag data does match the request tag, the valid bit indicates that the selected cache line is invalid, and the location of the bit error corresponds with the valid bit.

37. The method of claim 32, further comprising:
outputting a cache miss signal in response to the determination that the portion of the selected cache line including at least the tag data includes one or more bit errors and the location of the bit error is indeterminate.

38. The method of claim 32, wherein the error correction code is a Hamming code.

39. The method of claim 32, wherein the error correction code is operative to detect and correct a single bit error and to detect a double bit error.

40. The method of claim 32, wherein the steps of determining if the tag data and the request tag differ, determining a location of at least one differing bit, determining from the error correction code, and determining the location of at least one bit error are performed in parallel.

41. A computer readable storage medium having stored thereon a hardware description program that when executed by a processor performs an operation comprising:
receiving a request tag identifying instructions and/or data specified by a cache request;
receive receiving tag data identifying the contents of at least one selected cache line;
receiving a tag error correction code for at least a portion of the selected cache line including at least the tag data;
outputting a first signal indicating that the tag data matches the request tag;

outputting a second signal indicating if the tag data and the request tag differ by a single differing bit and indicating a location of the single differing bit within the selected cache line;

outputting a third signal indicating an existence and a location of an error in the portion of the selected cache line including the tag data; and outputting a cache hit signal in response to the first signal indicating that the tag data does not match the request tag, the second signal indicating that the tag data and the request tag differ by a single differing bit, the third signal indicating the existence and the location of the error in the portion of the selected cache line including the tag data, and the location of the single differing bit being the same as the location of the error in the portion of the selected cache line.

42. The computer readable storage medium of claim 41, wherein the hardware description program is expressed using a general purpose programming language.

43. The computer readable storage medium of claim 41, wherein the hardware description program is expressed using a hardware description language.

44. The computer readable storage medium of claim 41, wherein the hardware description program is expressed using a netlist.

* * * * *